No. 692,824. Patented Feb. 11, 1902.
A. M. BURLESON.
PORK LOINING MACHINE.
(Application filed Mar. 14, 1901.)
(No Model.) 2 Sheets—Sheet 2.

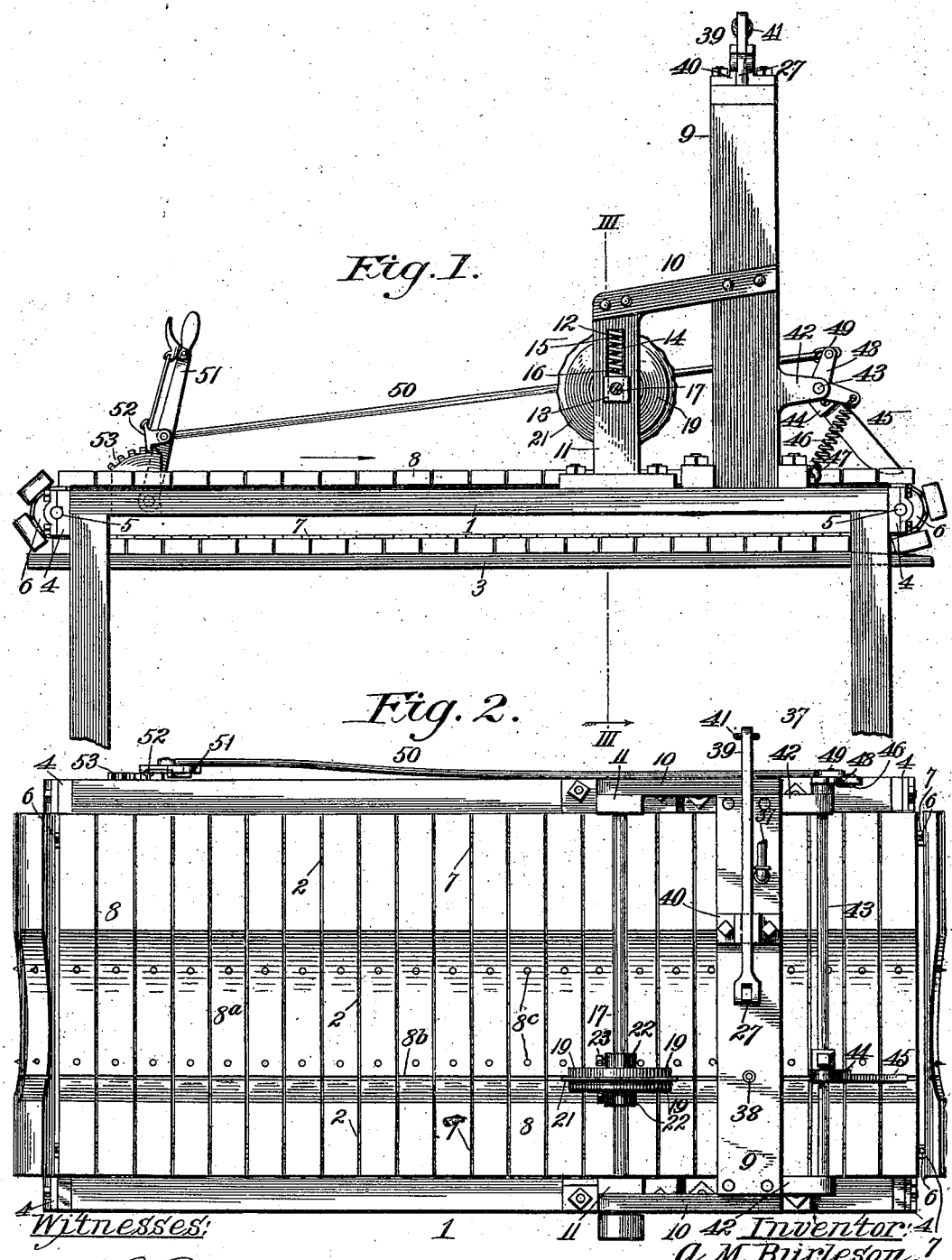

Witnesses:
H. C. Rodgers
Arthur McArthur

Inventor:
A. M. Burleson.
By Fischer Thorpe
attys.

United States Patent Office.

ANDREW M. BURLESON, OF KANSAS CITY, KANSAS.

PORK-LOINING MACHINE.

SPECIFICATION forming part of Letters Patent No. 692,824, dated February 11, 1902.

Application filed March 14, 1901. Serial No. 51,040. (No model.)

*To all whom it may concern:*

Be it known that I, ANDREW M. BURLESON, a citizen of the United States, residing at Kansas City, Wyandotte county, Kansas, have invented a new and useful Pork-Loining Machine, of which the following is a specification.

My invention relates to pork-loining machines; and it consists, essentially, of a traveling conveyer for the side of meat, a rotary saw to cut through the ribs and self adjustable to accommodate "sides" of varying thickness, an adjustable scoop-knife of shape to cut the loin and overlying bones clear of the fat and outlying bones, means to effectually prevent the accumulation of fat on said scoop-knife, and a knife to sever the fat clear through along the line of cut made by the saw.

The invention further consists in providing means to limit the depth of cut made by the saw and in the provision of a continuous groove in the conveyer to insure the passage of the knife clear through the skin and underlying fat.

The invention further consists in certain novel and peculiar features of construction and organization, as hereinafter described and claimed, and my object is to provide a machine which in charge of a single operator efficiently removes the loin from the side of meat far more expeditiously and economically than it can be accomplished by hand.

In order that the invention may be fully understood, reference is to be had to the accompanying drawings, in which—

Figure 3:
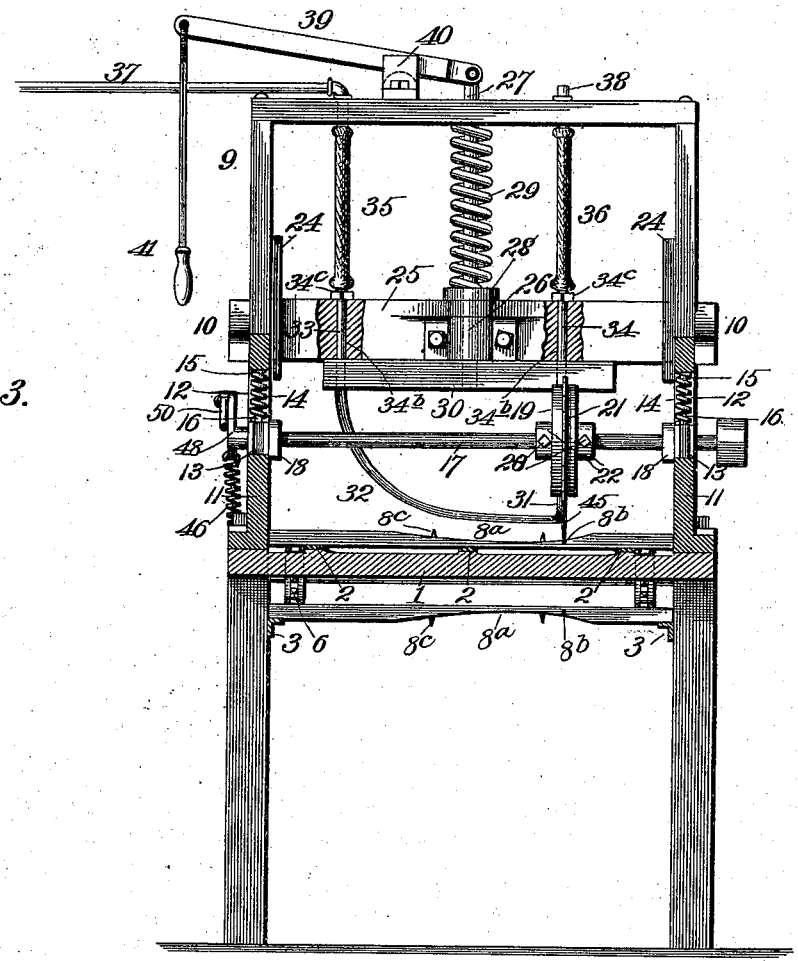
Figure 4:
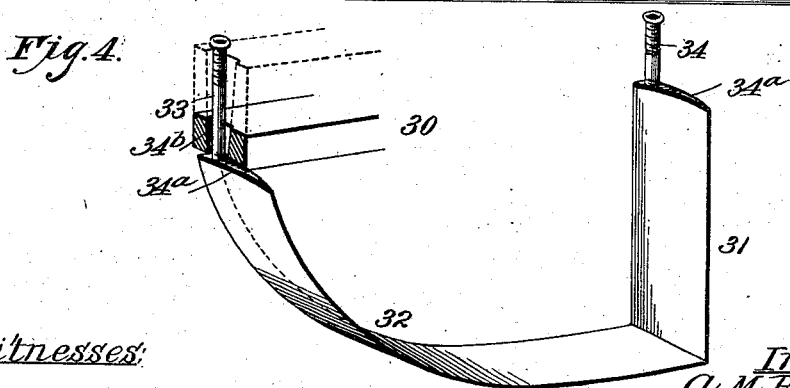

Figure 1 is a side elevation of a pork-loining machine embodying my invention. Fig. 2 is a top plan view of the same. Fig. 3 is a vertical section taken on the line III III of Fig. 1. Fig. 4 is an enlarged detail perspective view of the scoop-knife.

In the said drawings, 1 designates a table or bench of suitable height and provided, by preference, with a plurality of longitudinal tracks 2, extending its full length, and with a pair of longitudinal rails 3, connecting its legs, for a purpose which presently appears.

Journaled in bearings 4 at opposite ends of the table are shafts 5, upon which are mounted sprocket-wheels 6, engaged by longitudinally-extending sprocket-chains 7, connected by cross-slats 8, arranged closely together by preference, so as to constitute, in conjunction with the chains, a solid yet flexible endless conveyer, the same being adapted to be driven in the usual or any preferred manner and provided with a concave surface $8^a$, a longitudinal groove $8^b$, and upwardly-projecting pins $8^c$. The upper portion of the conveyer rests upon the tracks 2 for the purpose of creating a minimum friction without the use of antifriction-rollers, which are more expensive, and said tracks also insure the direct longitudinal movement of the conveyer by preventing the chains swinging laterally between the sprocket-wheels. The lower portion of the conveyer is prevented from sagging by riding the supporting-rails 3, and thus operates with more freedom than it would if permitted to sag.

Vertically erected on the table at a suitable point is a rectangular superstructure 9, and forward of and connected to the same by bars 10 are standards 11, bolted to the table at their lower ends. Said standards are provided with vertical slots 12, in which are slidingly mounted bearing-blocks 13, held yieldingly depressed by springs 14, secured at their opposite ends upon depending pins 15 on the standards and upwardly-projecting pins 16 on the blocks. A transverse shaft 17 is journaled in said bearing-blocks and provided with collars 18 to prevent endwise movement. Mounted on the shaft at a suitable point is a circular saw 21, the preferred construction being to key the same on the shaft between rollers 19, journaled thereon between collars 22, secured by set-screws 23, said rollers being of less diameter than the saw in order to form a shoulder which will press upon the bones at opposite sides of the saw-cut, and thus positively determine the depth of the latter, the fact that the shoulder turns at a speed corresponding to the conveyer movement offering a resistance which renders the action of the saw more positive and reliable and eliminates any possibility of the saw jerking the meat from its proper position on the conveyer. Of course a shoulder at only one side of the saw will usually be sufficient to limit the depth of cut; but I prefer to employ the same at both sides. This rotary saw is arranged above the upper portion of the conveyer a distance approximately equal to a lean side of meat, the springs permitting the saw to rise and thereby automatically accommodate itself to sides of greater thickness.

Mounted to reciprocate vertically in ways 24 of the superstructure is a cross-head 25, and extending vertically through the same, through the bearing 26, secured thereto, and through the superstructure is a rod 27, said rod having a collar 28 above the cross-rod and an expansive spiral spring 29 interposed between the collar and the top of the superstructure for the purpose of holding the cross-head yieldingly depressed. Secured rigidly on the lower end of said rod is a cross-bar 30, and depending from the same is a hollow scoop-knife, V-shaped in cross-section and comprising a vertical edge 31, arranged to operate in the same vertical plane as the rotary saw and depending a distance below the latter corresponding to the thickness of an average tenderloin, and the curved edge 32, connecting with the lower end of the vertical cutting edge, and projecting upward from the upper ends of said scoop-knife and through the superposed cross-heads are pipes 33 and 34, connected at their upper ends by flexible pipes 35 and 36 to a steam-supply pipe 37 and an exhaust-pipe 38, respectively, in order that live steam may be utilized to heat the scoop-knife, and thereby in effect so lubricate the same that it will freely separate the tenderloin from the fat without having the latter cling to it and clog its movement. To effect a slight vertical adjustment of the cutting edge of the knife, the upper ends of the same are secured, as at 34ª, to have a slight oscillatory movement on the bottom of bar 30, the openings 34ᵇ in bar 30 and cross-head 25, through which pipes 33 34 extend, being of form to permit of an adjustment therein of said pipes, clamping-nuts 34ᶜ to engage the upper side of the cross-head serving to secure the knife-edge at the desired point of adjustment, and as pipes 35 36 are flexible they offer no resistance to this oscillatory adjustment of the scoop-knife or to the vertical reciprocatory action of the cross-head. To raise the scoop-knife, I employ a lever 39, pivoted to the upper end of rod 27 and fulcrumed on a bracket 40 upon the superstructure, the lever being preferably manipulated by a flexible cable 41, depending within convenient reach of the person in control of the machine.

Journaled in bearing-arms 42, projecting rearwardly from the superstructure, is a transverse shaft 43, and secured by a set-screw upon the shaft is a hollow crank or socket 44, in which the upper end of the knife 45 fits and is bolted or otherwise adjustably supported, said knife extending downward and rearward in the same vertical plane as the rotary saw and the vertical cutting edge of the scoop-knife and having its lower end projecting into the longitudinal groove of the conveyer. This knife is adapted to be held in its operative position by a retractile spring 46, connected at its lower end, as at 47, to a fixed part of the superstructure and at its upper end to one arm of a bell-crank lever 48 upon shaft 43, the opposite end of said lever having a pin-and-slot connection, as at 49, with the pull-rod 50, connected at its front end to the lever 51, fulcrumed on the table, said lever being provided with the usual dog 52 for engagement with the notched sector 53, secured to the table, the engagement of the dog with the front portion of the sector serving to hold the knife raised out of the groove referred to and therefore inoperative. When the dog engages the rear portion of the sector, as shown, the knife is held depressed by spring 46, but is free to yield upwardly without injury should a bone or other hard substance pass under it, the pin of the bell-crank lever sliding in the slot of rod 50.

In practice assuming that the conveyer is traveling in the direction indicated by the arrow, Fig. 1, that the saw is rotating, and that the scoop-knife is heated to the required degree by steam passing through it the attendant places a side of meat on the concave surface of the conveyer and upon the upwardly-projecting pins 8ᶜ to hold it solidly in place, these pins being of sufficient length to project through the skin. The meat is arranged with the edge of the loin most remote from the backbone in vertical alinement with groove 8ᵇ and in this position is carried forward, and the ribs, presented upwardly, are cut by the saw, the vertical edge 31 of the scoop-knife passing through the saw-cut and separating the registering edge of the loin from the fat, while the curved portion 32 of said knife underlies the ribs, its edge following the contour of the lower edge of the loin, so as to separate the latter neatly from the underlying fat, the heat of said scoop-knife against the fat serving to lubricate the former, and thereby prevent the fat from clinging to it and interfering with its proper operation. As the meat passes the scoop-knife with the loin and superposed ribs completely severed from the fat that portion of the fat and skin underlying the loin may be severed from the remainder by the knife 45, which, having its edge projecting down into groove 8ᵇ, cuts clear through the same, as will be readily understood. When it is desired to provide what is known as an "extra"—namely, a part adapted to be dry-salted or sweet-pickled—knife 45 is raised and secured in its inoperative position. The sides of meat are placed successively upon the front end of the conveyer and, if desired, the machine may be controlled by a single attendant, who is enabled as the sides successively pass under the saw to grasp cable 41 and raise the scoop-knife sufficiently high to coincide with the junction-point of the loin and the fat. If an exceptionally high speed is desired, it will be necessary to have a second attendant to place the meat on the front end of the conveyer, which may be of any suitable or preferred length and may also be adapted to discharge the meat into any suitable receptacle or upon a second conveyer (not shown) for its conveyance to a different part of the plant.

From the above description it will be apparent that I have produced a pork-loining machine of simple, strong, durable, and inexpensive construction, which can be easily controlled, and which embodies the features of advantage enumerated as desirable in the statement of invention, and while I have illustrated and described its preferred embodiment it is to be understood that it is susceptible of modification in various particulars without departing from the spirit and principle of construction involved.

Having thus described the invention, what I claim as new, and desire to secure by Letters Patent, is—

1. In a machine of the character described, a driven conveyer, a saw above the same to cut through the rib-bones of a "side" of meat carried by the conveyer, and a scoop-knife, embracing an edge to pass through the cut made by the saw, and an edge to underlie the bones and tenderloin below and scoop the tenderloin from the underlying fat.

2. In a machine of the character described, a driven conveyer, a saw above the same, means to yieldingly oppose movement which increases the distance between said saw and conveyer, and a scoop-knife having an edge to follow the line of saw-cut and an edge extending at an angle to the first-named edge and adapted to scoop the tenderloin from the underlying fat.

3. In a machine of the character described, a driven conveyer, a rotating saw above the same, and a scoop-knife having an edge to follow the line of cut made by the saw and an edge extending at an angle to the first-named edge and adapted to separate the tenderloin from the underlying fat.

4. In a machine of the character described, a driven conveyer, a rotary saw above the same, springs holding said saw yieldingly depressed, and a scoop-knife having an edge to follow the line of cut made by the saw and an edge extending at an angle to the first-named edge and adapted to separate the tenderloin from the underlying fat.

5. In a machine of the character described, a driven conveyer, a saw above the same, means for holding the same yieldingly depressed, means to limit the depth of saw-cut, and a scoop-knife having an edge to follow the line of cut made by the saw and an edge extending at an angle to the first-named edge and adapted to separate the tenderloin from the underlying fat.

6. In a machine of the character described, a driven conveyer, a saw above the same, means for holding the saw yieldingly depressed, and a yieldingly-depressed scoop-knife having an edge to follow the line of cut made by the saw and an edge extending at an angle to the first-named edge and adapted to separate the tenderloin from the fat.

7. In a machine of the character described, a driven conveyer, a saw above the same, means for holding the saw yieldingly depressed, a yieldingly-depressed scoop-knife to follow the line of cut made by the saw and to separate the tenderloin from the fat, and means to adjust the same to accommodate the thickness of the fat underlying the tenderloin.

8. In a machine of the character described, a driven conveyer, a saw above the same, a scoop-knife to follow the saw-cut and separate the tenderloin from the underlying fat, and a knife also following the saw-cut and adapted to cut through the fat, substantially as described.

9. In a machine of the character described, a driven conveyer provided with a longitudinal groove in its upper side, a saw vertically above and operating in the plane of said groove, and a scoop-knife embracing an edge to follow the saw-cut, and an edge to sever the underlying tenderloin from the fat, and a knife adapted to register with and project into said groove.

10. In a machine of the character described, a driven conveyer provided with a longitudinal groove in its upper side, a saw vertically above and operating in the plane of said groove, a scoop-knife embracing an edge to follow the saw-cut, and an edge to sever the underlying tenderlion from the fat, and a spring-depressed knife adapted to register with and project into said groove.

11. In a machine of the character described, a driven conveyer provided with a longitudinal groove in its upper side, a saw vertically above and operating in the plane of said groove, and a scoop-knife embracing an edge to follow the saw-cut, and an edge to sever the underlying tenderloin from the fat, a spring-depressed knife adapted to register with and project into said groove, and means for raising and holding said knife to an inoperative position.

12. In a machine of the character described, a suitable framework, a driven conveyer thereon, a saw above the conveyer, a superstructure upon the frame, a spring-depressed cross-head mounted therein, a hollow scoop-knife below and movable with the cross-head, pipes projecting from the ends of the same up through the cross-head, flexible pipes for the supply and discharge of steam connecting the cross-head with the upper part of the superstructure, one being the supply and the other the discharge pipe for the steam, and means for elevating the cross-head and the knife when desired, substantially as described.

13. In a machine of the character described, a driven conveyer, a driven shaft, a rotary cutter mounted on the shaft, and a shoulder journaled on the shaft adjacent to the cutter, and adapted by pressing upon the meat carried by the conveyer and subjected to the action of the cutter, to limit the depth of cut made by the latter, and to rotate at a speed corresponding to that of the conveyer and, by preventing the meat from being dragged forwardly rapidly by the cutter, afford a resistance which insures a more reliable cutting operation.

14. In a machine of the character described, a driven conveyer, a driven shaft, a rotary cutter mounted on the shaft, a shoulder journaled on the shaft adjacent to the cutter, and adapted by pressing upon the meat carried by the conveyer and subjected to the action of the cutter, to limit the depth of cut made by the latter, and to rotate at a speed corresponding to that of the conveyer and, by preventing the meat from being dragged forwardly rapidly by the cutter, afford a resistance which insures a more reliable operation, and means to yieldingly oppose movement which increases the distance between said cutter and conveyer.

In testimony whereof I affix my signature in the presence of two witnesses.

ANDREW M. BURLESON.

Witnesses:
H. C. RODGERS,
G. Y. THORPE.